US012465527B2

(12) United States Patent
Schuler et al.

(10) Patent No.: US 12,465,527 B2
(45) Date of Patent: Nov. 11, 2025

(54) DEVICE AND METHOD FOR JOINING MULTI-PART TAMPON APPLICATORS (71) Applicant: Ruggli AG, Koblenz (CH)

(72) Inventors: Samuel Schuler, Basel (CH); Patrik Scheiber, Niederhasli (CH); Antonello Zuddas, Neuhausen am Rheinfall (CH)

(73) Assignee: Ruggli AG, Koblenz (CH)

( * ) Notice: Subject to any disclaimer, the term of this patent is extended or adjusted under 35 U.S.C. 154(b) by 130 days.

(21) Appl. No.: 17/916,859

(22) PCT Filed: Apr. 4, 2021

(86) PCT No.: PCT/EP2021/058822
§ 371 (c)(1),
(2) Date: Oct. 4, 2022

(87) PCT Pub. No.: WO2021/204732
PCT Pub. Date: Oct. 14, 2021

(65) Prior Publication Data
US 2023/0157902 A1 May 25, 2023

(30) Foreign Application Priority Data
Apr. 6, 2020 (CH) ........................................ 412/20

(51) Int. Cl.
*A61F 13/20* (2006.01)
*A61F 13/26* (2006.01)
(Continued)

(52) U.S. Cl.
CPC ...... *A61F 13/2097* (2013.01); *A61F 13/2082* (2013.01); *A61F 13/263* (2013.01);
(Continued)

(58) Field of Classification Search
CPC ..... B65B 35/46; B29C 49/42095; B32B 1/08; B65G 29/00; A61F 13/2097
See application file for complete search history.

(56) References Cited

U.S. PATENT DOCUMENTS 2,624,078 A 1/1953 Winter et al.
3,568,577 A * 3/1971 Voss .................... A61F 13/2097
28/120

(Continued)

FOREIGN PATENT DOCUMENTS

CH 715 307 A2 3/2020
EP 2 335 666 A1 6/2011
(Continued)

OTHER PUBLICATIONS

International Search Report in PCT/EP2021/058822, dated Jun. 25, 2021.

*Primary Examiner* — Scott W Dodds
(74) *Attorney, Agent, or Firm* — Collard & Roe, P.C.

(57) ABSTRACT

A device for joining multi-part tampon applicators, in particular three-part tampon applicators, which include at least one outer cylinder and a first inner cylinder, includes at least one joining station with at least one receiving finger for receiving one outer cylinder and one first inner cylinder each, as well as a first inner cylinder supply for loading the at least one receiving finger with at least one first inner cylinder and an outer cylinder supply for loading the at least one receiving finger with at least one outer cylinder. The device further includes a processing station for joining the at least one outer cylinder to the at least one first inner cylinder, and the at least one joining station is arranged radially on a circular disk, in particular so that the at least one receiving finger is oriented essentially radially. A method joins multi-part, in particular three-part, tampon applicators.

18 Claims, 7 Drawing Sheets (51) Int. Cl.
  *B29C 49/42* (2006.01)
  *B32B 1/08* (2006.01)
  *B65G 29/00* (2006.01)

(52) U.S. Cl.
  CPC ...... *A61F 13/266* (2013.01); *B29C 49/42095* (2022.05); *B32B 1/08* (2013.01); *B65G 29/00* (2013.01)

(56) References Cited

U.S. PATENT DOCUMENTS

| | | |
|---|---|---|
| 6,343,558 B1 | 2/2002 | Shepard |
| 2013/0264303 A1* | 10/2013 | Andersen .............. C23C 16/045 427/575 |
| 2021/0292102 A1 | 9/2021 | Schuler et al. |
| 2022/0047429 A1 | 2/2022 | Schuler et al. |

FOREIGN PATENT DOCUMENTS

| | | |
|---|---|---|
| JP | S51-109196 A | 9/1976 |
| JP | 2010-081989 A | 4/2010 |
| RU | 2044530 C1 | 9/1995 |
| WO | 2010/013605 A1 | 2/2010 |
| WO | 2019/233989 A1 | 12/2019 |
| WO | 2020/052999 A1 | 3/2020 |

* cited by examiner

DEVICE AND METHOD FOR JOINING MULTI-PART TAMPON APPLICATORS

CROSS REFERENCE TO RELATED APPLICATIONS

This application is the National Stage of PCT/EP2021/058822 filed on Apr. 4, 2021, which claims priority under 35 U.S.C. § 119 of Switzerland Application No. 412/20 filed on Apr. 6, 2020, the disclosure of which is incorporated by reference. The international application under PCT article 21(2) was not published in English.

The present invention relates to a device for joining multi-part tampon applicators, as well as a method for joining multi-part tampon applicators, both in particular three-part tampon applicators.

TECHNOLOGICAL BACKGROUND

Tampon applicators are insertion aids for tampons. In their simplest embodiment, tampon applicators are cylindrical tubes in which a tampon is placed. The tampon applicators have a distal mouth opening through which the tampon is ejected after it has been placed in the body orifice. Tampon applicators are often equipped with a corresponding plunger for this purpose. In the simplest embodiment, this plunger can also be designed as a tubular cylinder, in this case an inner cylinder.

Such a two-part tampon applicator may further be equipped with a pull-out mechanism. In such, usually two-part, embodiments, the inner cylinder is initially located substantially within the outer cylinder and, in some cases, may initially house the tampon. In operation, the inner cylinder is first pulled through the proximal opening of the outer cylinder until a mechanical gripping device tensioned in advance engages with the tampon. Usually, a stop is provided at the proximal end of the outer cylinder so that the inner cylinder cannot be pulled out too far. If this engagement creates a gripping connection between the inner cylinder and the tampon, pressing the inner cylinder into the outer cylinder again can displace the tampon from the latter and release it through the mouth opening into the body orifice.

In most cases, tampon applicators are made of a plastic material and have a grip area at a suitable location, e.g., in the proximal area of an outer cylinder. Improved gripping properties can be ensured by roughening the material, rubberizing, special structuring or a recessed grip.

In addition to the two-part, three-part or even multi-part design tampon applicators can build up the plunger at least partially telescopically, for example by providing a plurality of inner cylinders which can initially be displaced in relation to one another on bearings and, after mutual engagement, become a rigid plunger.

All these telescopic designs of tampon applicators serve in particular to make tampons with tampon applicators overall more compact.

In order to provide tampon applicators that have both a suitable grip area and are as compact as possible, three-piece tampon applicators have proven particularly useful. These tampon applicators essentially comprise three tubular cylinders. The outer cylinder has a tapered head portion that terminates in a distal mouth through which the tampon is ejected during operation. The proximal portion of the outer cylinder has a grip recess, or otherwise tapered portion, that facilitates holding the tampon applicator, particularly when the tampon is ejected, i.e., the plunger is used to eject the tampon from the cylinder. The plunger is housed in two parts overall, with a first inner cylinder supported in the outer cylinder in a storage condition and housing a second inner cylinder. In order to transfer the tampon applicator from a stored state to a ready-to-use state, the second inner cylinder, which preferably has a grip area, is pulled until it telescopes out of the first inner cylinder and engages with it, e.g., by forming a corresponding groove and/or flange on the first and/or second inner cylinder. Finally, the second cylinder is also pulled a little way out of the grip area of the outer cylinder and enters into an operative connection with the tampon, so that a renewed insertion of the now latched plunger from the two inner cylinders causes a displacement of the tampon and presses it out of the mouth area of the outer cylinder into the body orifice.

In order to join the parts, it is advantageous if certain structures are initially guided into one another without friction, i.e., without having to overcome mechanical resistance. This is followed by thermoplastic deformation, which completes the joining process and joins the individual applicator parts together in a longitudinally displaceable manner.

The decisive factor in the manufacture of tampon applicators is to produce as efficiently as possible while maintaining the consistently high quality expected of such a hygiene product.

Thus, there is a need for devices and machines suitable for joining such multi-part tampon applicators so that they can later be fitted with the appropriate tampons and supplied for packaging.

Basically, such devices are linear joining lines, where step by step the different parts are joined together. However, this has proved to be disadvantageous, as the space require-ment is comparatively high, and monitoring the process to ensure quality is cumbersome.

DESCRIPTION OF THE INVENTION

It is an object of the present invention to provide a device with which at least one disad-vantage of the known is overcome. It is a particular object of the present invention to provide a device of the type mentioned at the beginning, with which high numbers of pieces can be joined to tampon applicators while maintaining constant quality.

At least one of these objects was solved with the characterizing part of the independent claims.

This object was solved with a device for joining multi-part tampon applicators, in particular three-part tampon applicators, and a corresponding method according to characterizing parts of the independent claims.

One aspect of the present invention relates to a device for joining multi-part tampon applicators, in particular three-part tampon applicators. The multi-part tampon applicators include an outer cylinder and a first inner cylinder. The device comprises at least one joining station with at least one receiving finger for receiving one outer cylinder and one first inner cylinder each. The device according to the invention further comprises a first inner cylinder supply for loading the at least one receiving finger with at least one first inner cylinder. It further comprises an outer cylinder supply for loading the at least one receiving finger with at least one outer cylinder. A first processing station is used to join the at least one outer cylinder to the at least one first inner cylinder. The at least one joining station is arranged radially on a circular disk. In particular, it is arranged on a circular disk such that the at least one receiving finger is oriented substantially radially. For the purposes of the present invention, a multi-part tampon applicator may be under-stood as a tampon applicator of the type mentioned at the beginning. Such an applicator essentially comprises an outer cylinder which, in operation, constitutes the distal end of the tampon applicator and has as its distal end a mouth opening through which the tampon is ejected. Further, such a tampon applicator in the present example comprises at least a first inner cylinder having a diameter smaller than the inner diameter of the first outer cylinder so that it is supported and movable in the longitudinal direction of the tampon applicator. Particularly preferably, the first inner cylinder is guided in its translatory movement in the longitudinal direction. This can be done, for example, by another cylinder, in the present example by the outer cylinder.

An outer cylinder according to the invention can be equipped with any other structures. For example, the outer cylinder can have petal-shaped structures in the distal mouth area that allow the distal mouth area to be closed off. Furthermore, the outer cylinder can be provided with knobs, rubber linings, roughening, indentations or other recessed grips which facilitate handling of the outer cylinder and the tampon applicator as a whole. In the present example, the tampon applicator according to the invention may have an outer cylinder which is tapered at the proximal end. This tapered area may be provided with the named structures to facilitate gripping. In operation, the tampon applicator would be gripped at this tapered region, inserted, and result in the ejection of a tampon by actuation of a first and/or second internal cylinder by displacement of said first and/or second internal cylinder along the longitudinal axis of the tampon applicator, particularly by petal-shaped elements at the distal mouth opening.

For the purposes of the present invention, a joint occurs when the parts have a stop with respect to each other in preferably both translational directions of motion along the longitudinal axis. This can be done, for example, by means of a flange, a groove and/or a rib that prevents the movement of a part beyond a certain locking point. This joining can mean that a certain detent point is formed, e.g., in that individual parts can enter into a rigid operative connection with each other. For example, a three-part tampon applicator is conceivable, comprising an outer cylinder, a first inner cylinder and a second inner cylinder. The outer cylinder has a larger outer diameter than the first inner cylinder and the second inner cylinder in turn has a smaller outer diameter than the first inner cylinder. Overall, both the second and first inner cylinders are smaller in diameter than the first outer cylinder such that they can be slid into the outer cylinder. In this embodiment, the first and second outer cylinders form a telescoping plunger for ejecting the tampon from the outer cylinder. For this purpose, in a first step, the second outer cylinder is pulled out of the first inner cylinder in a proximal direction until it is substantially rigid via a snap-in connection with the first inner cylinder. Further, the first inner cylinder is pulled out of the outer cylinder until its distal end comes into operative contact with the distal end of a tampon. If the entire plunger is now pushed back into the outer cylinder, this active connection generates a pressure on the distal end of the tampon and pushes it out of the first outer cylinder through the mouth at the distal end of the first outer cylinder and into the body orifice.

A joint in the sense of the present invention would exist in this three-part tampon applicator if all three parts can carry out the above-mentioned translatory movements, but the second inner cylinder is prevented from falling out of the first inner cylinder, or the first inner cylinder from falling out of the outer cylinder. For this purpose, a stop can be provided in the inner circumference of the outer cylinder or the first inner cylinder. In addition, a corresponding flange can be provided in the outer circumference of the first inner cylinder and the second inner cylinder, which comes into operative connection with this stop. The concentrically arranged cylinders can be moved in translation relative to each other, but cannot fall apart. Such a tampon applicator would be a product of a corresponding device according to the present invention. This tampon applicator would be able to be loaded with a tampon in the further course of the process. In a particular embodiment, such a joint in the sense of the present invention would be obtained, for example, by means of a conical expansion of the proximal end of the second inner cylinder.

For the purposes of the present invention, the terms distal and proximal are to be under-stood in relation to the user's application. In this specific case, for example, the proximal end would be the end facing the user's hand. The distal end would be the end facing the body orifice in use.

In a particular embodiment, the at least one joining station is arranged radially on the circular disk in such a way that a processing circumference can be moved off the circular disk during operation by rotating the circular disk about its circular center. Particularly preferably, the first inner cylinder supply, the outer cylinder supply and the first processing station are also arranged radially on the outside of the processing circumference.

In the sense of the present invention, a radial orientation is present, respectively the at least one receiving finger is substantially radially oriented, if e.g., the respective outer finger is arranged substantially parallel to a radius of the circular disk with respect to its longitudinal extension.

By means of the device according to the invention, the joining of multi-part tampon applicators can take place efficiently by means of a rotatable circular disk, which presents the joining station with the corresponding receiving fingers respectively to the supplies and the individual processing stations, as well as an ejector, so that an operative connection can be established between these and the joining station. Due to the circular design, the entire device is space-saving and can operate with high quantities.

In a particular embodiment, a plurality of joining stations is provided radially on the circular disk. Particularly preferably, the joining stations are arranged essentially radially symmet-rically on the circular disk so that imbalances are largely avoided when the circular disk rotates.

In another particular embodiment, a joining station according to the invention comprises a plurality of receiving fingers. Thus, a device according to the invention can join in batches by assigning a batch of tampon applicators to a processing station at the same time depending on the number of receiving fingers on a joining station.

In a particular embodiment, the multi-part tampon applicator comprises a second inner cylinder. The device then further comprises a second inner cylinder supply for loading the at least one receiving finger with at least one second inner cylinder. In addition, the device further comprises a second processing station for joining the at least one first inner cylinder to the at least one second inner cylinder. In this embodiment, the device is used for joining three-piece tampon applicators.

In a particular embodiment, the first processing station is configured to reshape the first or second inner cylinder.

In a particular embodiment, the second processing station is equipped to form a first or second inner cylinder.

In a particular embodiment, the present invention comprises a plurality of processing stations each adapted to always form a proximal inner cylinder. In the example of a three-part tampon applicator, it would always be the second inner cylinder that would be formed.

Each processing station, in a further embodiment, may be configured to form the second inner cylinder to a predetermined dimension. In this way, the reshaping of the second inner cylinder can be carried out gently, resulting in better reshaping.

In a particular embodiment, the processing station is configured to perform a conical expansion as a forming operation.

In a particular embodiment, the at least one receiving finger comprises a plurality of diameters. In particular, the receiving finger has diameters that taper in the radial direction.

In a particular embodiment, each diameter is configured to respectively receive an outer cylinder, a first inner cylinder, and/or a second inner cylinder.

Correspondingly from the inside to the outside, i.e., in the radial direction of the circular disc, these would be a first diameter suitable for accommodating an outer cylinder, a second diameter suitable for accommodating a first inner cylinder, and a third diameter suitable for accommodating a second inner cylinder.

In the present case, all cylinders are designed as hollow cylinders, which include a lumen.

This lumen is substantially filled according to the diameter of the receiving finger when the receiving finger picks up the corresponding cylinder.

In operation, a receiving finger would be loaded from the inside to the outside, i.e., for example, a second inner cylinder would first be applied to the smallest diameter of the receiving finger in the case of a three-part tampon applicator. Subsequently, a first inner cylinder would be slipped over this second inner cylinder and guided in the opposite direction to the radial direction over the corresponding middle diameter of the receiving finger. Finally, an outer cylinder would be slipped over both inner cylinders to a corresponding diameter of the receiving finger.

In a particular embodiment, the receiving finger has a plurality of shoulders that serve as a stop to define the appropriate diameter to receive a cylinder.

In another particular embodiment, the receiving finger has a tapered tip. This tip can, for example, have a tapered design to make it easier to accommodate and guide the cylinders.

In a particular embodiment, the diameters are limited against each other by a shoulder as a stop, which merges into a tapered taper, which merges into the smaller diameter.

The lengths of the various diameter ranges of the receiving finger are between one-third and 80% of the lengths of the corresponding second inner cylinders.

In a particular embodiment, the receiving finger is configured such that the second inner cylinder is expanded when it is placed on the receiving finger.

In another particular embodiment, the receiving finger is configured such that the second inner cylinder is held on the receiving finger by means of static friction.

Particularly preferably, the second inner cylinder has an outer flange that enters into a bearing-mounted joint with the first inner cylinder when the first inner cylinder is slipped over the second inner cylinder onto the receiving finger.

In a particular embodiment, the receiving finger is designed to be heatable. Particularly preferably, the receiving finger can be heated to a temperature that allows the material of the applicator parts to be formed. In particular, the receiving finger can adopt a temperature of between 8° and 180°, thus allowing the applicator parts to be formed when they are fitted and external pressure is applied. Processing stations that apply this external pressure are particularly preferred.

In an alternative and/or complementary embodiment, the applicator parts are joined without forming. For this purpose, the applicator parts, in particular the outer cylinder and the first inner cylinder, can be equipped with a snap-in mechanism that enables purely mechanical joining. In this embodiment, the processing stations may be configured, for example, to apply a kinetic force to a proximal end of the cylinders, in particular a kinetic force by which the outer cylinder and a first inner cylinder and/or a first inner cylinder and a second inner cylinder may form a snap-in connection. This device may be particularly well suited for joining applicators that are substantially made of non-thermoplastic mate-rials, such as comprising cardboard, or are made of cardboard.

In an alternative and/or complementary embodiment, the processing station, or processing stations, are designed to set the corresponding temperature range of between 80 to 180° Celsius and to perform the corresponding forming operation. For example, a skilled person can set the temperature range depending on the material properties of the inner cylinder to be formed.

In a particular embodiment, the at least one receiving finger comprises at least one clamping mandrel for holding an outer cylinder and/or a first inner cylinder.

In particular, a clamping mandrel may be formed with a retaining force that acts on the corresponding cylinder to hold it in place. Particularly preferably, the clamping mandrel is movable and designed to pivot or be spring-loaded about an axis on the receiving finger.

The clamping mandrel may be configured, for example, to be folded when a cylinder is received so that the clamping mandrel does not provide resistance to receiving the cylinder. Once the cylinder is picked up, the mandrel can, for example, act on the cylinder via a spring-loaded retaining force and hold it in place.

In this particular embodiment, the clamping mandrel may be re-activated for an ejection so that it is collapsed and substantially flush with the receiving finger so that stripping of the finished joined tampon applicator is not prevented.

In an alternative or complementary embodiment, the clamping mandrel is designed as a bracket that fixes a loaded cylinder with a restoring force.

In a particular embodiment, the first processing station and/or second processing station is configured to form an outer cylinder, first inner cylinder and/or second inner cylinder received on a receiving finger. Particularly preferably, this forming is a thermal forming.

Most preferably, a thermoplastic material is softened by supplying heat so that no melting process takes place yet, but the material as a whole can be formed more easily.

In a particular embodiment, the device comprises a plurality of joining stations, in particular between two and 24 joining stations.

With a plurality of joining stations, batchwise processing of multiple batches can be performed simultaneously. For example, one batch can be loaded while another batch is already being formed. Particularly preferably, the number of joining stations corresponds to the maximum geometrically possible processing stations and supplies. It is also conceivable that individual joining stations are provided as a reserve. Furthermore, individual joining stations may not have a corresponding processing station in the opposite side if, for example, cooling is to take place. For example, after a thermal forming operation, initially a joining station may not have a corresponding processing station and/or supply as a counterpart after a rotation of the circular disk, if cooling of the previously formed part must take place instead.

In a particular embodiment, the supplies and/or processing stations are built radially around the circular disk so that they occupy an angular area by being arranged opposite a joining station. Particularly preferably, the supplies, or processing stations, are provided with supplying elements, or processing elements, which are arranged essentially concentrically to receiving fingers on the joining stations in the same angular range. For example, supplies can guide the cylinders to be mounted to the receiving fingers in a number of paths equal to the number of receiving fingers. This allows parallel and simultaneous loading of all receiving fingers of a joining station. Alternatively and/or additionally, the receiving fingers of a joining station can also be loaded serially, i.e., with a supply which loads the receiving fingers one after the other in their angular range. For this purpose, the supply can be designed to swivel, for example, so that a first equipment in a concentric alignment with a receiving finger is followed by a swiveling movement that entails a renewed concentric alignment with respect to a second receiving finger.

In a particularly preferred embodiment, the device comprises between two and twenty-four joining stations, in particular between four and twenty, most preferably twelve joining stations.

In another particular embodiment, each joining station has a plurality of receiving fingers each for receiving an outer cylinder of a first inner cylinder and a possible second inner cylinder.

Particularly preferably, each joining station has a number of between two and 16 receiving fingers, further particularly preferably between four and eight receiving fingers, most preferably of four receiving fingers.

In a particular embodiment, the supplies or processing stations located on the processing stations correspond to the number of receiving fingers and are aligned in such a way that when the joining station is in operative connection with the processing station or the supply in the corresponding angular range, these are arranged concentrically with the receiving fingers.

In a particular embodiment, the processing stations are designed as pressing knobs that use pressure and heat to reshape an inner cylinder correspondingly received on the receiving finger. Particularly preferably, the pressing knobs have a substantially conical flare which is pushed into the proximal end of an inner cylinder for forming.

In a particular embodiment, the supplies comprise at least one separation unit. The separation unit can be used to transfer the corresponding cylinders to an equipment in as orderly a manner as possible. The equipment can load the appropriate cylinders onto the receiving fingers as an element of the supply. Isolation can be realized through different ways. For example, a shaker hopper and appropriate belt or belt guides can be used to allow proper alignment of the cylinders.

In a particular embodiment, the supplies have sliders suitable for loading the cylinders onto the receiving fingers. These sliders can be designed as plungers that press the cylinders onto the receiving fingers. The sliders can also be designed as grippers, which grasp the circumference of the cylinders and slip them over the receiving fingers.

If the cylinders have a flange, for example, the flange can be used to align the cylinders accordingly. In this example, for example, a belt drive would be such that the cylinders would substantially extend through the belts and be held in place by the flange between the belts. The flange rests on two spaced belts. The belt spacing corresponds essentially to the outside diameter of such a cylinder.

For cylinders that do not have a flange, e.g., outer cylinders, an alternative sorting ma-chine can be used to separate the corresponding cylinders. These cylinders can also be guided with spaced belts. However, the belt spacing here does not correspond to the outside diameter of the cylinders, but is slightly smaller so that the cylinders rest on the belts. Separation can take place, for example, by means of rollers. Thus, a transition region can be defined in which the cylinders are conveyed at two different speeds, particularly preferably in which the cylinders are accelerated from a first to a second speed in the transition region. Such acceleration causes any interconnected outer cylinders to be separated by accelerating the first cylinder in the conveying direction that comes into contact with the new speed away from the following one.

Particularly preferably, such a supply comprises a belt system which is driven by means of rollers and conveys the cylinders in the direction of an equipment element. As pressure rollers, these rollers can also run at different speeds so that the cylinders can be separated.

Suitable conveyor systems that use belts to convey applicators can be found by the skilled person in WO 2019/233989.

In a particular embodiment, a supply according to the invention further comprises an alignment unit. For example, an alignment unit can correctly align cylinders that have different types of ends, such as outer cylinders with a petal-shaped mouth and a grip area, for loading. Particularly preferably, the alignment is detected by an optical sensor.

In a particular embodiment, the alignment unit comprises a robot, in particular a multi-axis robot as the alignment unit.

In a further particular embodiment, the alignment unit comprises a robot which aligns the supplied outer cylinders in each case in such a way that the mouth opening points in the opposite direction to the radial extent of the receiving fingers, i.e., the mouth opening is turned up onto the receiving finger and the distal end of the tampon applicator moves onto the receiving finger first.

In a particular embodiment, the circular disk is rotatable so that the joining station can be brought into operative connection with a radially arranged inner cylinder supply, outer cylinder supply, first and/or second processing station.

In addition to the belts described, a belt drive with corresponding guide rails can also be used to guide the cylinders in an alternative or supplementary embodiment.

In a particular embodiment, the processing station is integral with the supply. In this embodiment, forming takes place at the same time as the receiving finger is fitted with a corresponding cylinder. For example, a second inner cylinder can be first applied to a receiving finger. Subsequently, a first inner cylinder is slipped over this second inner cylinder and applied to the receiving finger and, at the same time, a proximal end of the second receiving finger is heated so that a stop is created which prevents the first inner cylinder from falling off the second inner cylinder again. Similarly, forming can take place simultaneously with the loading of each cylinder, so that joining and loading take place synchronously.

In another particular embodiment, loading takes place via appropriate supplies, and only one processing station performs all forming steps in a single process. For example, the receiving finger can be loaded in such a way that no force is yet applied to the individual cylinders. After all cylinders are applied to the receiving finger, a pressure is applied in a single step by supplying heat, which reshapes the corresponding cylinder parts to be formed and completes the joint.

The device according to the invention can be used to join multi-part tampon applicators quickly and efficiently in batches, which can be achieved in a space-saving and efficient manner.

The device according to the invention is particularly suitable for joining telescopic three-part tampon applicators. As described above, these tampon applicators have an outer cylinder which houses the tampon and has a mouth through which the tampon is ejected into the body orifice. Further, these preferably have a grip area that is proximal to the outer cylinder and forms a tapered area. This area can preferably serve as a bearing for guiding a first inner cylinder, which in a packaged state is almost completely housed in this grip area. This inner cylinder accommodates a second inner cylinder which is bearing guided by this inner cylinder in an analogous manner. A snap-in mechanism at the proximal end of the first inner cylinder causes the second inner cylinder to rigidly snap with the second inner cylinder when the second inner cylinder is telescoped out of the first inner cylinder. If the resulting plunger from these two inner cylinders is now pressed again into the outer cylinder, the tampon is released through the mouth opening into the body orifice.

Another aspect of the present invention relates to a method for joining multi-part tampon applicators, in particular three-part tampon applicators described at the beginning. The method includes the step of aligning a joining station with a first inner cylinder supply. Alignment may mean, for example, in the sense of the present invention and taking into account the device described above, that a joining station enters an angular region of a supply and substantially aligns itself with this supply so that an operative connection may be established between the supply and the joining station. The method according to the invention further comprises the step of loading a first receiving finger of the joining station with a first inner cylinder. This equipment can be carried out batchwise, i.e., any number of receiving fingers of a joining station can be loaded with the inner cylinders? at the same time, or it can be carried out serially in that the receiving fingers are moved away from an equipment station and one receiving finger after the other is provided with an inner cylinder.

Subsequently, the method according to the invention comprises the further step of aligning the joining station with an outer cylinder supply or a second inner cylinder supply. The latter is the case with an, e.g., three-part tampon applicator where, first, another inner cylinder is applied, which can be mounted accordingly as described above, e.g., in a grip area of the outer cylinder.

The alignment of the joining station, which is arranged radially on a circular disk, is performed by a circular rotation of the circular disk. This can mean, for example, that the circular disk is rotated around its center in a certain angular range. Preferably, this rotation is clocked. Alternatively and/or additionally, this rotation can also be continuous, provided that the control of the corresponding processing stations is adapted, e.g., by synchroni-zation with the rotation of the circular disk. Even with continuous rotation, there is a point in time when the processing stations, or the supplies, are concentrically aligned with the corresponding receiving fingers. At this point, the corresponding processing or loading can take place.

Particularly preferably, the alignment of the joining station arranged radially on a circular disk takes place in such a way that the receiving finger is brought into a coaxial operative connection with the inner cylinder supply and/or the outer cylinder supply and/or a processing station.

Particularly preferably, this takes place simultaneously for a plurality of joining stations for each joining station. That is, at the same time that one joining station has its receiving fingers in concentric alignment with a first supply, another joining station has its receiving fingers concentric with respect to a second supply. In this way, receiving fingers that are already loaded with a second inner cylinder, for example, can be loaded with the first inner cylinder at the same time, while receiving fingers that are already empty and ready again receive first inner cylinders.

In a particular embodiment, the method according to the invention further comprises aligning the joining station with a processing station. This processing station is preferably a forming station. Thus, this method further comprises the step of forming the first inner cylinder and/or the second inner cylinder by applying heat and pressure. As described, these steps can be performed synchronously. Particularly preferably, the processing stations comprise processing stations, for example pressing knobs, which can come into operative connection with the inner cylinders on the receiving fingers.

In a particular embodiment, the inner cylinder with the smallest diameter of the multi-part tampon applicator is first loaded onto the first receiving finger when loading the joining station. In particular, the inner cylinder with the smallest diameter is first fitted to a tip area with the smallest diameter of the receiving finger.

In another particular embodiment of the method according to the invention, the outer cylinder is clamped on the receiving finger by means of a clamping mandrel exerting a restoring force. Particularly preferably, it is detachably clamped.

In a further particular embodiment, this release can take place actuated by the control of a pivot point mounted on the receiving finger. For this purpose, for example, the clamping mandrel is made flush with the receiving finger against the restoring force so that the latter does not offer any resistance to the ejection of the finished tampon applicator.

In an alternative embodiment, the receiving cylinder is applied to the receiving finger against the restoring force of a clamping mandrel so that, when a detent is released, this restoring force produces an ejection of the finished tampon applicator.

For a person skilled in the art, it is self-evident that all the above-mentioned embodiments can occur in any combination with one another in a realization according to the invention, provided that they are not mutually exclusive.

In the following, the present invention will now be explained in more detail with reference to specific examples and figures, without being limited to them.

A person skilled in the art may infer from these examples further advantageous embodiments for the design of the present invention.

The figures are schematic, and for simplicity, the same parts have been given the same reference numerals.

FIGURE DESCRIPTION

Showing.

FIG. 3a joining station according to the invention in a front view;

FIG. 5a separation unit;

FIG. 7a processing station.

EMBODIMENT OF THE INVENTION

Figure 1A:
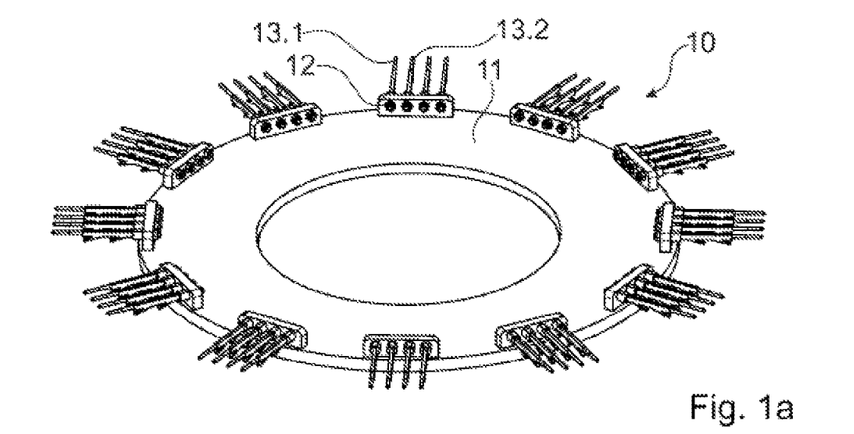
FIG. 1a a circular disk with a plurality of joining stations.

FIG. 1a schematically shows a circular disk 11. The circular disk 11 is designed as an annular disk and is the central element of the device according to the invention. In the present example, the circular disk 11 has a plurality of joining stations 12. Specifically, in this example, there are twelve joining stations 12. The joining stations 12 are arranged radially on the circular disk 11 essentially along the outer circumference of the circular disk 11. In the present example, the circular disk 11 shows a central recess, but this is not necessary. Preferably, the circular disk 11 is rotatably driven. This can be done, for example, by means of a toothed gear on the underside of the circular disc 11 (not shown). Also conceivable would be a drive by means of a belt, an electric drive, or a circular motor with a corresponding active connection between the axle and the circular disk 11.

The joining stations 12 have a plurality of receiving fingers. In the present example, the joining station 12 has a total of four receiving fingers 13.1, 13.2. The receiving fingers 13.1, 13.2 extend essentially radially from the center of the circular disk from its outer circumference. In this way, the joining stations 12 and the corresponding receiving fingers 13.1, 13.2 can be brought into operative connection with processing stations or supply units likewise provided radially on the outside of the circumference. The corresponding equipment, i.e., the number of joining stations and the corresponding number of receiving fingers, can be adapted by the person skilled to the geometric conditions and to the corresponding available supplies or processing stations. In the present example, the receiving fingers are all provided substantially on one plane. However, joining stations with ver-tically offset receiving fingers or even staggered receiving fingers are also conceivable. Such joining stations can, for example, be built in a floor-by-floor manner with a certain number of receiving fingers on one level.

Figure 1B:
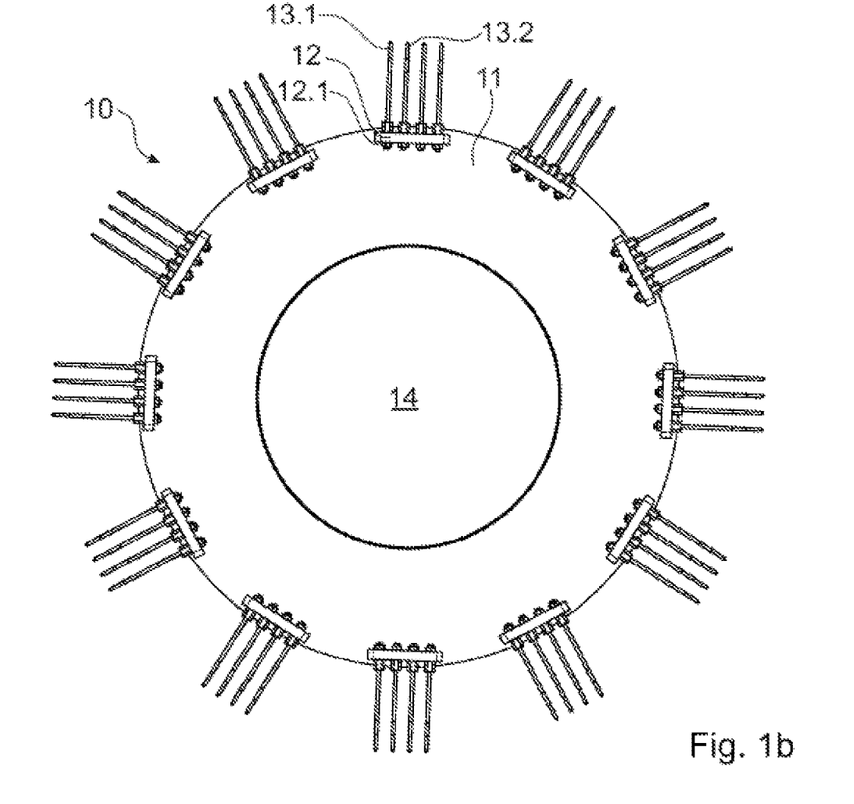
FIG. 1b the circular disk of FIG. 1a in plan view.

In FIG. 1b, a station element 10 according to FIG. 1a is shown in top view. The circular disk 11 has a central recess 14, which serves primarily to reduce the moving mass. A total of twelve joining stations 12 are mounted on the circular disk 11, comprising a joining block 12.1 from which four receiving fingers 13.1, 13.2 project out of the outer circumference of the circular disk 11 into a processing area. In this processing area, for example, supplies and processing stations can intervene. These supplies and processing stations can perform single or a plurality of operations on the cylinders, which are first fixed on the receiving fingers. The processing steps may include further loading, forming, embossing, impregnating, coating, perforating, and/or ejecting a cylinder. Due to the fact that the processing takes place on a radius, the present station 10 can be used in a space-saving manner. Robots can optionally intervene in the area of the circular disk 11 to perform any necessary operations at the joining stations. In the processing area, i.e., directly at the outer circumference of the circular disc 11, a drop-through can be provided, where, e.g., defectively found cylinders or tampon applicators can be collected and discharged after successful ejection. Alternatively, this area can also be used to receive the finished tampon applicators, which are stripped from the receiving fingers after joining is complete.

The compact design allows optical sensors to survey the entire processing area. This means that the work steps can always be monitored, and it is possible to intervene at an early stage should any malfunctions occur. Optical sensors can also be used at several points for detailed monitoring of individual processing steps. For example, the final forming actions can be monitored using optical sensors. For example, it is possible to check whether an incorrectly formed tampon applicator is present within a batch and to sort it out accordingly.

Figure 2A:
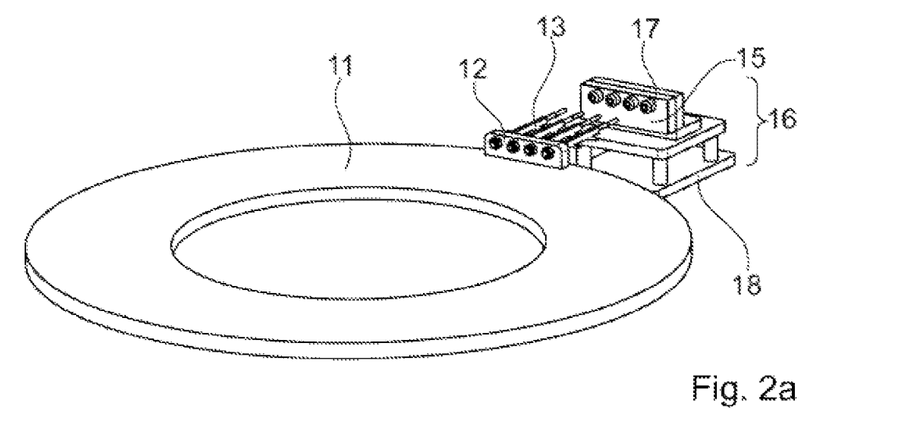
FIG. 2a an example of a joining station aligned with a processing station.

In FIG. 2a, a circular disk 11 with a single joining station 12 is shown for simplicity. Four receiving fingers protrude from this joining station 12 into a processing area. This joining station 12 has moved into the angular range and thus into operative connection with a processing station 16. The processing station 16 has a plurality of presses 17 that are concentrically aligned with the receiving fingers. The presses 17 may be oriented, for example, to cause a forming of a proximal end of a tampon applicator. A second inner cylinder correspondingly fitted to the outermost and smallest diameter of the receiving finger 13 could, for example, be widened and reshaped proximally by means of a corresponding mating shape of the pressing knobs 17, so that a natural stop is created. The presses 17 are mounted on a block 15 and rest on a plate 18. The plate 18 is arranged to move against the radius of the circular disk 11. Alternatively, the joining stations can also be moved against the corresponding processing stations in the radial direction.

Figure 2B:
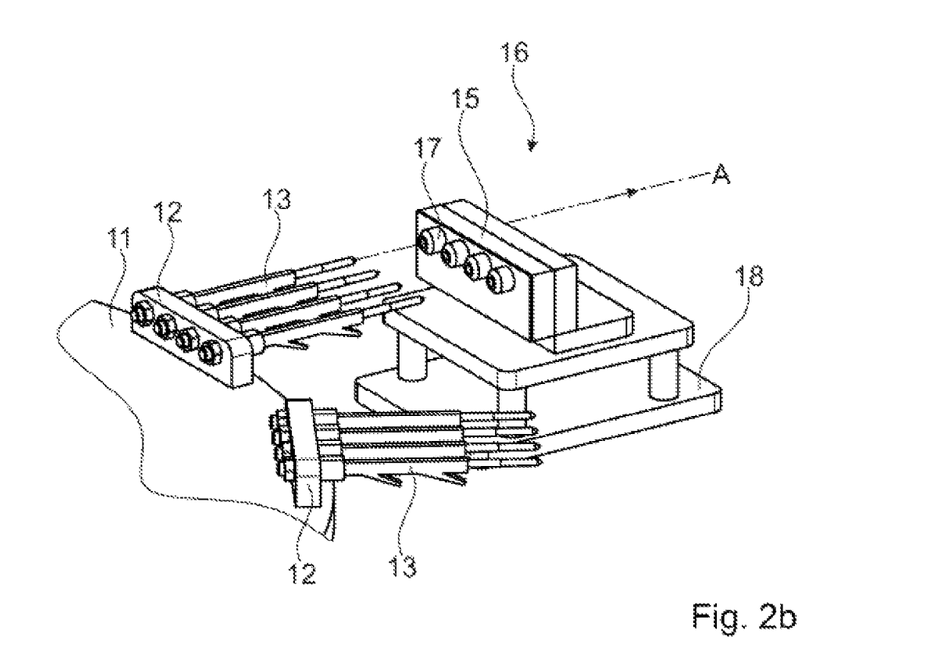
FIG. 2b the aligned joining station of FIG. 2a in detail.

FIG. 2b shows this arrangement again in more detail. Two joining stations 12 are shown on the circular disk 11, which have a plurality, totaling four receiving fingers 13 in the present example. Opposite to these in a concentric orientation and essentially parallel to the radial extension A of the circular disk 11, pressing knobs 17 are arranged on a processing plate 15 of a processing station 16. This pressure plate 15 is movable so that it can move towards the receiving fingers 13 against the radial extension A, and accordingly exert a forming action on loaded cylinders.

Figure 2C:
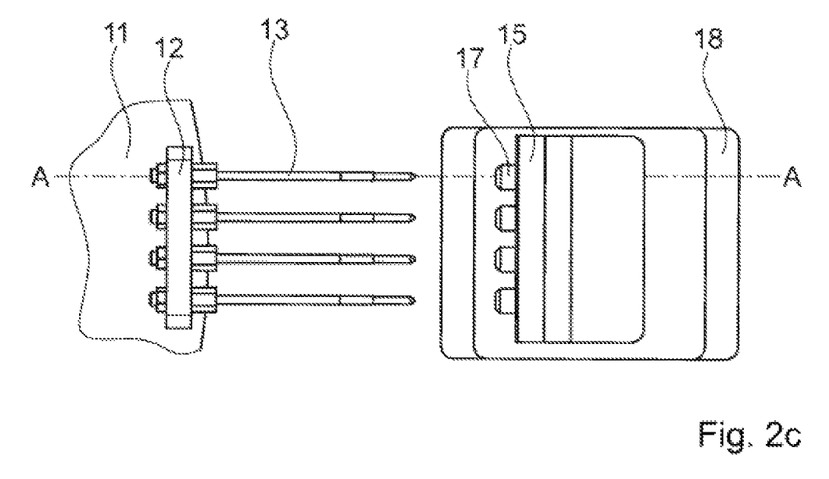
FIG. 2c the joining station in FIG. 2a in a top view.

In FIG. 2c, this device is shown in plan view, in which the circular disk 11 has said mentioned guide station 12, which has four radially extending receiving fingers 13. The longitudinal direction of the receiving fingers is concentric with the pressing knobs 17 on a processing plate 15. The processing plate 15 is mounted on a rail so that it can be displaced on a locking plate 18 in the direction of the receiving fingers to generate a contact pressure on them.

Figure 3:
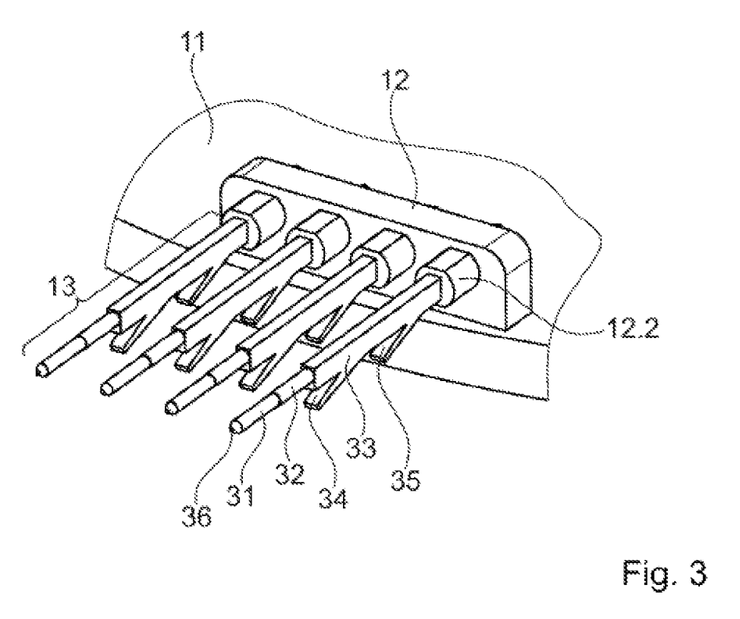

FIG. 3 shows a corresponding joining station 12 in detail. The joining station 12 here has four sleeves 12.2, from each of which a receiving finger 13 protrudes. The receiving finger 13 has a plurality of diameters 31, 32, 33. Overall, starting from the sleeve, the finger 13 has a first diameter 33. Two clamping mandrels 35, 34 are provided on this first diameter. This first diameter 33 is suitable to accommodate an outer cylinder. The two clamping mandrels 33, 34 serve to hold this outer cylinder by means of a restoring force. In operation, the outer cylinder in this example would be the last cylinder to be applied to the receiving finger.

This first diameter is followed by a second diameter 32, which is smaller than the inner diameter of the first inner cylinder. In operation, this first inner cylinder would be the second cylinder applied in the present example, which refers to three-piece tampon applicators.

Directly adjacent to this second diameter is a third diameter which tapers over a shoulder and terminates in a tip 36. This last diameter 31 is suitable to accommodate a second inner cylinder.

In operation, a second outer cylinder would first be slipped onto this last diameter 31. Through the tapered region, starting from the central diameter 32, the second inner cylinder is substantially releasably clamped to the receiving finger.

Figure 4A:
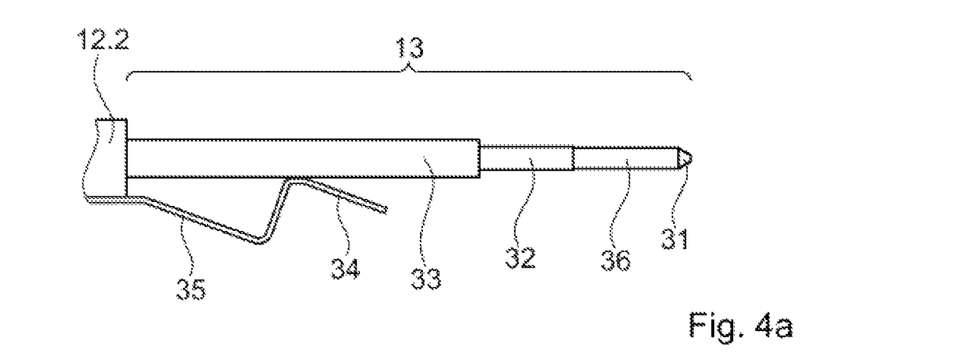
FIG. 4a a profile view of a receiving finger.
Figure 4B:
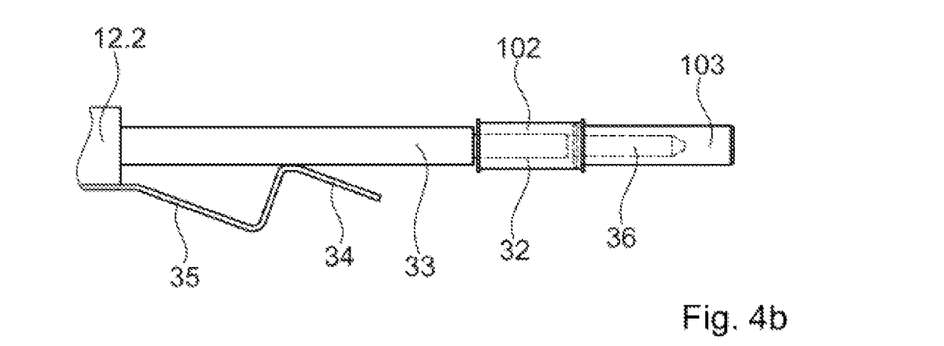
FIG. 4b the receiving finger of FIG. 4a loaded with two inner cylinders.
Figure 4C:
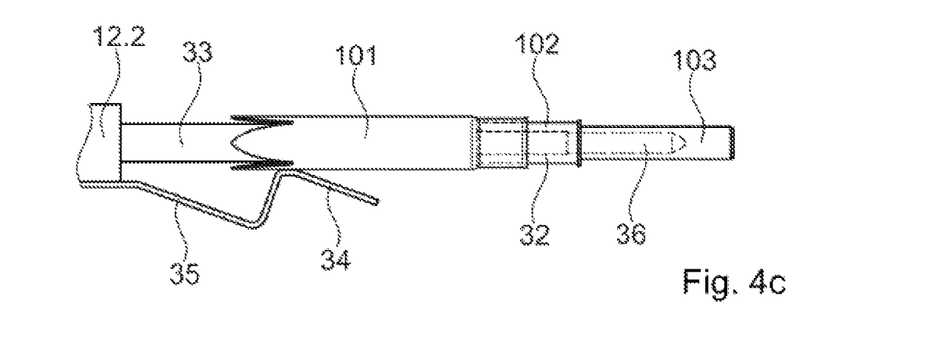
FIG. 4c the receiving finger of FIG. 4a loaded with all parts of a three-part tampon applicator.

To illustrate this mode of operation, FIGS. 4a to 4c show this step-by-step loading. FIG. 4a shows a receiving finger 13 in profile. To the left of a sleeve 12.2 the joining station would start. A first diameter 33 projects from the sleeve 12.2, which has two clamping mandrels 35, 34 formed as brackets. The two clamping mandrels 35, 34 exert a restoring force on the receiving finger so that after picking up an outer cylinder, the latter is held.

The first diameter 33 closes with a stop followed by a second diameter 32. This second diameter 32 is followed by another stop and a tapered section into the third diameter 36. The receiving finger terminates in a substantially tapered tip 31.

In FIG. 4b, two inner cylinders 102, 103 are already applied to the receiving finger. A second inner cylinder 103 was first slipped on over the last diameter so that it abuts the stop and is jammed in the tapered area. A first inner cylinder 102 is slipped over the latter, which extends substantially to the end of the second diameter.

FIG. 4c now shows how an outer cylinder is slipped over these two inner cylinders 102, 103.

The clamping mandrels 35, 34, which are formed as brackets, exert a restoring force on the outer cylinder 101. In this case, a first bracket part 35 protrudes at an angle from the sleeve 12.2 and exerts a contact pressure on the outer cylinder 101. A second bracket part 34 integral with the first bracket part 35 also protrudes at an angle and serves as a steering plate for receiving the outer cylinder 101.

Figure 5:
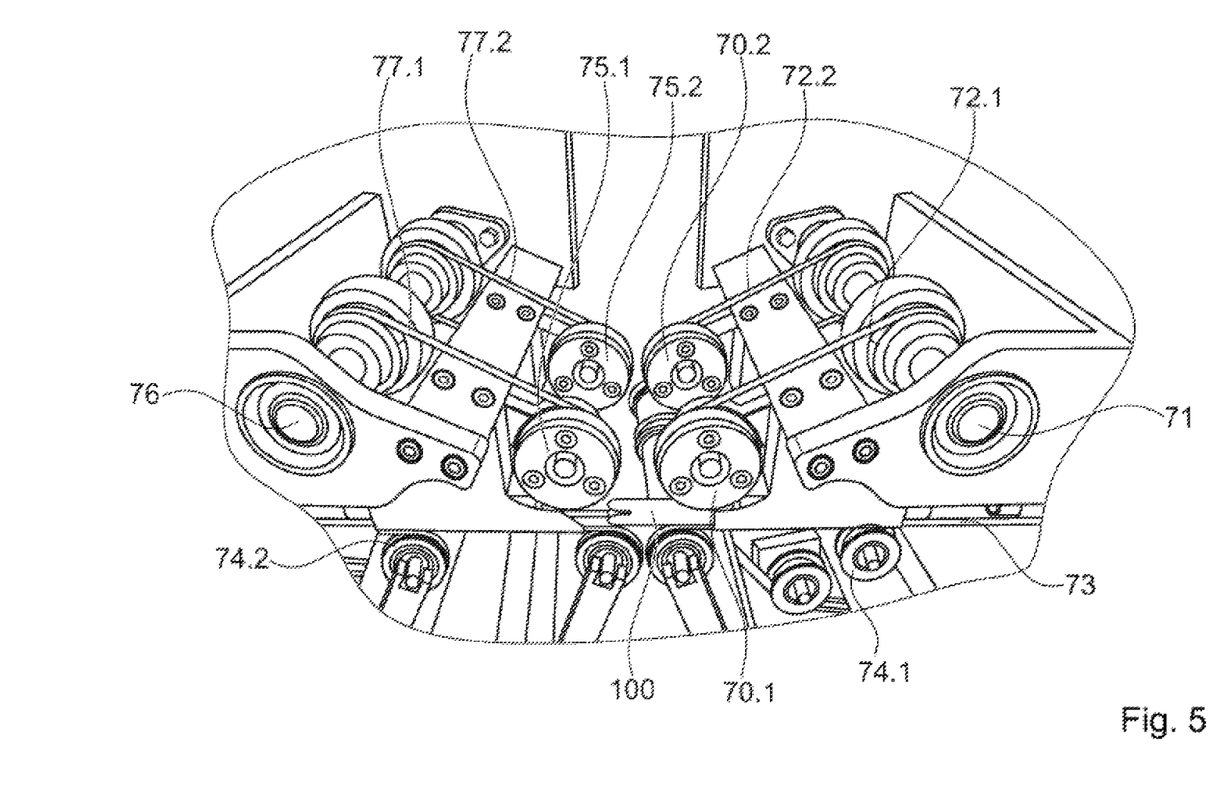

FIG. 5 shows a separation unit as it can be used to separate outer cylinders for the supply. It is important that corresponding outer cylinders, which have a petal-shaped distal mouth, are separated from each other, otherwise they can easily become hooked and cannot be loaded onto the receiving fingers in an orderly manner.

In the present example, the cylinders 100 are conveyed on belts 73. Drive rollers 74.1, 74.2 drive the corresponding belts. In the example shown, a transfer takes place from one belt system to the other. Rubberized acceleration rollers 75.1, 75.2 are provided above this transfer point, which are also driven by means of a belt drive 77.1, 77.2. Here, the outer cylinders 100 pass from a drive having a first speed 70.1, 70.2 to an area having a drive having a second speed 75.1, 75.2. The acceleration separates any interlocked outer cylinders. The belts are driven by drive shafts 71, 76 running at different speeds.

Figure 6:
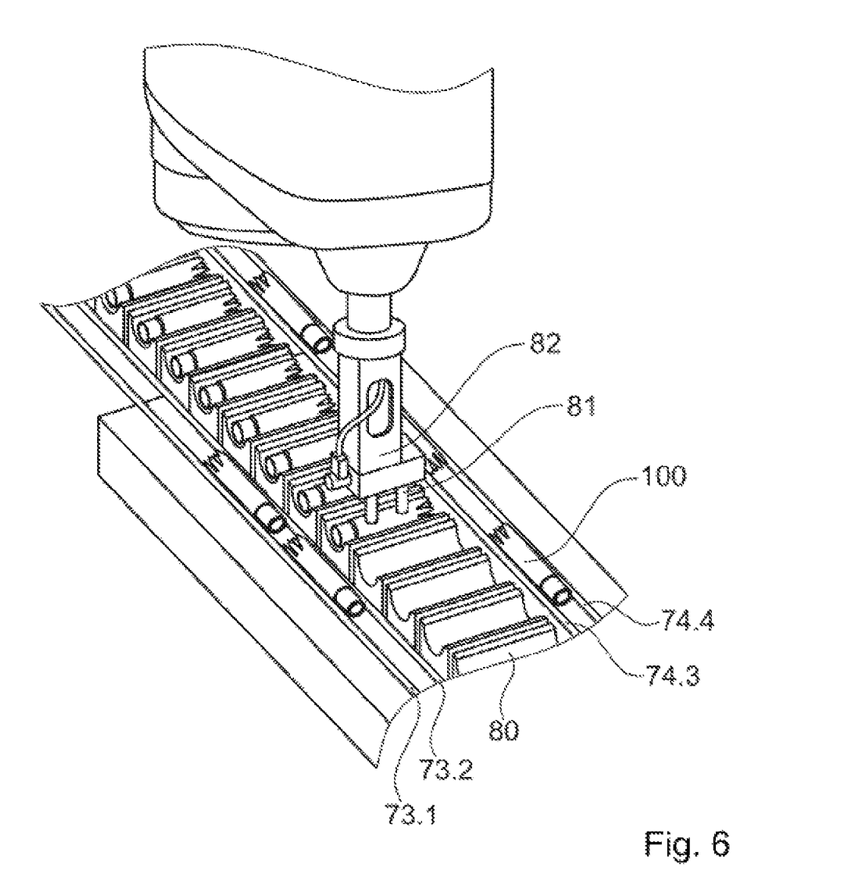
FIG. 6 an alignment unit.

FIG. 6 shows an alignment unit which also aligns said mentioned outer cylinders 100 in the same way for loading the receiving fingers. As before, the supply of the outer cylinders 100 is accomplished by two parallel belt drive systems, each with two belts 73.1, 73.2; 74.3, 74.4. A robot with a robot arm 82 and a gripper 81 grips the outer cylinders 100 and transfers them to a conveyor 80 in which the outer cylinders 100 are substantially parallel and all oriented the same way. The supply ends in a further robot system (not shown), which can, for example, remove a batch of outer cylinders from this conveyor unit 80 and load them accordingly onto the receiving fingers for loading.

Figure 7:
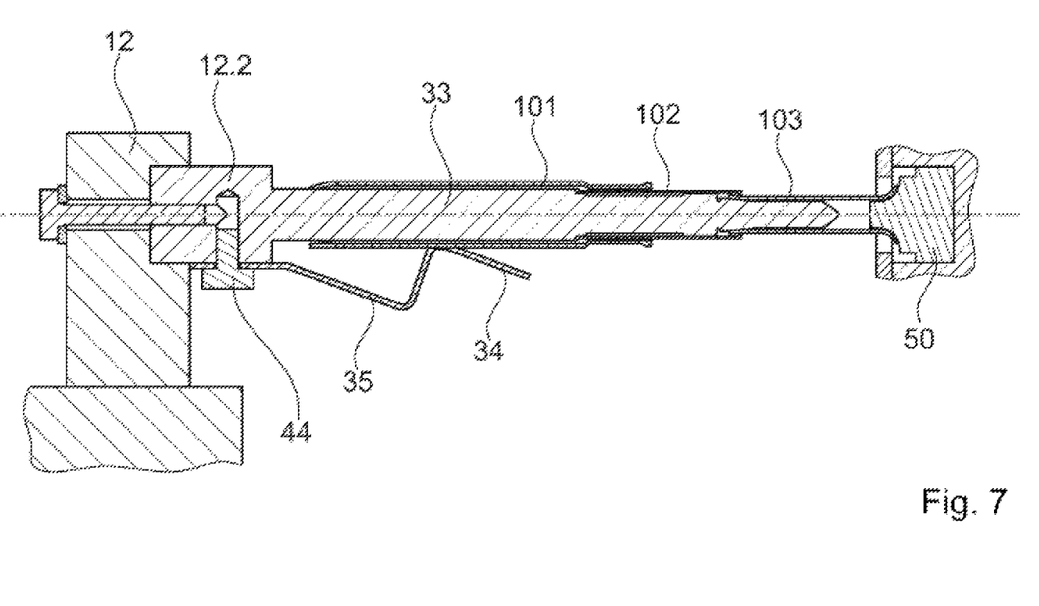

FIG. 7 shows how a joining station 12 with receiving finger is currently in operative connection with a processing station. The joining station 12 includes an outer cylinder 101 on a sleeve 12.2 on a first diameter 33. A first inner cylinder 102 is inserted into this, and a second inner cylinder 103 is also inserted into this.

The outer cylinder 101 is held in place by means of a resilient clamping mandrel formed as a bracket having a first bracket part 35 and a second bracket part 34.

The processing station includes a pressing knob 50 formed concentrically with respect to the longitudinal axis of the receiving finger, which pushes into the proximal end of the second inner cylinder, expanding it by means of a conical shape so as to produce an overall trumpet-shaped proximal end of the second inner cylinder 103.

This reshaping prevents the second inner cylinder 103 from falling out of the three-part tampon applicator by, for example, pushing through the mouth of the outer cylinder 101. This step can complete a joint according to the invention. However, this joining can also take place over a number of individual sub-steps. For example, a first forming can take place with a certain first contact pressure and a second forming with a certain second contact pressure. For each forming operation, a separate processing station with respective pressure knobs can be provided. This gradual reshaping can be repeated as many times as necessary to obtain the desired trumpet-shaped expansion of the proximal end of the tampon applicator. The device according to the invention can be used to join tampon applicators from several hollow cylinders in a space-saving and efficient manner in a fast throughput. The device according to the invention is particularly suitable for joining three-part tampon applicators with a telescopic plunger which is extended and locked in place.

The invention claimed is:

1. A device for joining multi-part tampon applicators, wherein the multi-part tampon applicators comprise an outer cylinder and a first inner cylinder, the device comprising:
   a. at least one joining station with at least one receiving finger for receiving one outer cylinder and one first inner cylinder each;
   b. a first inner cylinder supply for loading the at least one receiving finger with at least one first inner cylinder;
   c. an outer cylinder supply for loading the at least one receiving finger with at least one outer cylinder;
   d. a first processing station for joining the at least one outer cylinder to the at least one first inner cylinder;
   wherein the at least one joining station is arranged radially on a circular disk in such a way that the at least one receiving finger is oriented essentially radially.

2. The device according to claim 1, wherein the multi-part tampon applicators comprise a second inner cylinder and the device further comprises:
   a second inner cylinder supply for loading the at least one receiving finger with at least one second inner cylinder; wherein
   the first processing station is adapted for joining the at least one first inner cylinder to the at least one second inner cylinder.

3. The device according to claim 2, wherein the at least one receiving finger has a plurality of diameters.

4. The device according to claim 3, wherein each diameter is configured to respectively receive the at least one outer cylinder, the at least one first inner cylinder, and the at least one second inner cylinder.

5. The device according to claim 3, wherein the diameters taper in radial alignment.

6. The device according to claim 2, wherein the first processing station and/or a second processing station is designed to reshape the at least one outer cylinder, the at least one first inner cylinder and/or the at least one second inner cylinder received on a receiving finger.

7. The device according to claim 1, wherein the at least one receiving finger comprises at least one clamping mandrel for holding the at least one outer cylinder and/or the at least one first inner cylinder.

8. The device according to claim 1, wherein the device comprises a plurality of joining stations.

9. The device according to claim 1, wherein each joining station comprises a plurality of receiving fingers each for receiving an outer cylinder and a first inner cylinder.

10. The device according to claim 1, wherein the outer cylinder supply comprises a separation unit.

11. The device according to claim 1, wherein the circular disc is rotatable so that the joining station can each be brought into operative connection with a radially arranged inner cylinder supply, outer cylinder supply, first processing station and second processing station.

12. A method for joining the multi-part tampon applicators with the device according to claim 1, comprising the steps:
   a. aligning the at least one joining station with the first inner cylinder supply;
   b. loading the at least one receiving finger of the at least one joining station with the at least one first inner cylinder;
   c. aligning the at least one joining station with the outer cylinder supply or a second inner cylinder supply;
   d. loading the at least one receiving finger of the at least one joining station with the at least one outer cylinder or at least one second inner cylinder;
   wherein the alignment of the at least one joining station arranged radially on the circular disk is effected by a circular rotation of the circular disk.

13. The method according to claim 12, further comprising the steps of:
   aligning the at least one joining station with the first processing station; and
   forming the at least one first inner cylinder and/or the at least one second inner cylinder by applying heat and pressure.

14. The method according to claim 12, wherein when the at least one joining station is loaded, the at least one first inner cylinder or the at least one second inner cylinder with the smallest diameter of the multipart tampon applicator is first loaded onto the at least one receiving finger.

15. The method according to claim 14, wherein when the at least one joining station is loaded, the at least one first inner cylinder or the at least second inner cylinder with the smallest diameter of the multipart tampon applicator is loaded onto a tip region with the smallest diameter of the at least one receiving finger.

16. The method according to claim 12, wherein the at least one outer cylinder is clamped on the at least one receiving finger by a clamping mandrel exerting a restoring force.

17. The method according to claim 12, wherein the at least one outer cylinder is ejected by a clamping mandrel exerting a restoring force on the at least one receiving finger.

18. The method according to claim 12, wherein the alignment of the at least one joining station arranged radially on the circular disk is effected by the circular rotation of the circular disk so that the at least one receiving finger is brought into a coaxial operative connection with the inner cylinder supply and/or outer cylinder supply.

* * * * *